United States Patent
Winkelmann et al.

(10) Patent No.: US 11,321,146 B2
(45) Date of Patent: May 3, 2022

(54) EXECUTING AN ATOMIC PRIMITIVE IN A MULTI-CORE PROCESSOR SYSTEM

(71) Applicant: INTERNATIONAL BUSINESS MACHINES CORPORATION, Armonk, NY (US)

(72) Inventors: Ralf Winkelmann, Holzgerlingen (DE); Michael Fee, Cold Spring, NY (US); Matthias Klein, Poughkeepsie, NY (US); Carsten Otte, Stuttgart (DE); Edward W. Chencinski, Poughkeepsie, NY (US); Hanno Eichelberger, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 16/407,819

(22) Filed: May 9, 2019

(65) Prior Publication Data

US 2020/0356420 A1  Nov. 12, 2020

(51) Int. Cl.
| | |
|---|---|
| *G06F 9/46* | (2006.01) |
| *G06F 9/52* | (2006.01) |
| *G06F 12/084* | (2016.01) |
| *G06F 12/0842* | (2016.01) |
| *G06F 9/54* | (2006.01) |

(52) U.S. Cl.
CPC ............ *G06F 9/526* (2013.01); *G06F 9/546* (2013.01); *G06F 12/084* (2013.01); *G06F 12/0842* (2013.01)

(58) Field of Classification Search
CPC ........ G06F 9/526; G06F 9/546; G06F 12/084; G06F 12/0842

USPC ........................................................ 718/102
See application file for complete search history.

(56) References Cited

U.S. PATENT DOCUMENTS

| | | | |
|---|---|---|---|
| 5,682,537 A | 10/1997 | Davies | |
| 7,571,270 B1 | 8/2009 | Nemirovsky | |
| 8,533,395 B2 | 9/2013 | O'Connor et al. | |
| 9,201,802 B1 * | 12/2015 | Armangau | .............. G06F 9/526 |
| 9,239,795 B2 | 1/2016 | Agarwal et al. | |

(Continued)

FOREIGN PATENT DOCUMENTS

| | | |
|---|---|---|
| CN | 109684358 A | 11/2021 |
| WO | 2013062561 A1 | 5/2013 |

(Continued)

OTHER PUBLICATIONS

Pan, "Performance Modeling of Multi-Core Systems: Caches and Locks," Digital Comprehensive Summaries of Uppsala Dissertations from the Faculty of Science and Technology, 2016, p. 1-58, Uppsala University.

(Continued)

*Primary Examiner* — Bradley A Teets
(74) *Attorney, Agent, or Firm* — Robert R. Aragona

(57) ABSTRACT

The present disclosure relates to a method for a computer system comprising a plurality of processor cores, including a first processor core and a second processor core, wherein a cached data item is assigned to a first processor core, of the plurality of processor cores, for exclusively executing an atomic primitive. The method includes receiving, from a second processor core at a cache controller, a request for accessing the data item, and in response to determining that the execution of the atomic primitive is not completed by the first processor core, returning a rejection message to the second processor core.

20 Claims, 3 Drawing Sheets

(56) References Cited

U.S. PATENT DOCUMENTS

| | | |
|---|---|---|
| 9,329,890 B2 | 5/2016 | Busaba et al. |
| 9,678,806 B2 | 6/2017 | Che et al. |
| 9,697,121 B2 | 7/2017 | Bradbury et al. |
| 2002/0046230 A1 | 4/2002 | Dieterich |
| 2003/0018785 A1 | 1/2003 | Eshel |
| 2008/0082794 A1 | 4/2008 | Yu |
| 2009/0019098 A1 | 1/2009 | Gunda |
| 2012/0054760 A1 | 3/2012 | Chung |
| 2012/0215984 A1 | 8/2012 | Hady et al. |
| 2013/0014120 A1 | 1/2013 | Ross |
| 2015/0301871 A1 | 10/2015 | Duvuru et al. |
| 2016/0004639 A1* | 1/2016 | Vorbach .............. G06F 12/0893 711/122 |
| 2016/0188466 A1 | 6/2016 | Hady et al. |
| 2017/0116119 A1 | 4/2017 | Shum et al. |
| 2017/0177499 A1 | 6/2017 | Guthrie |
| 2017/0242797 A1 | 8/2017 | Wang |
| 2017/0286115 A1* | 10/2017 | Coleman ............. G06F 9/30047 |
| 2018/0018097 A1 | 1/2018 | Kazakov |
| 2018/0173625 A1 | 6/2018 | Moudgill et al. |
| 2018/0293114 A1 | 10/2018 | Mukherjee |
| 2019/0340124 A1 | 11/2019 | Khan |

FOREIGN PATENT DOCUMENTS

| | | |
|---|---|---|
| WO | 2018059655 A1 | 4/2018 |
| WO | 2020053126 A1 | 3/2020 |

OTHER PUBLICATIONS

Zheng et al., "A Parallel Page Cache: IOPS and Caching for Multicore Systems," HotStorage'12: Proceedings of the 4th USENIX Workshop on Hot Topics in Storage and File Systems, Jun. 13-14, 2012, p. 1-6, Boston, MA.

Woolbright, "Instruction Formats", 2016 [retrieved from internet Dec. 1, 2021, 4 pages, https://web.archive.org/web/20190717132902fw_/http://csc.columbusstate.edu/wollbright/instorg.htm.

Woolbright, "Load and Test Register", 2016, 2 Pages. https://web.archive.org/web/20150420181452/http://csc.columbusstate.edu/woolbright/Instructions/LTR.pdf https://web.archive.org/web/20150420181452/http://csc.columbusstate.edu/woolbright/INSTORG.HTM, (Year: 2015).

* cited by examiner

EXECUTING AN ATOMIC PRIMITIVE IN A MULTI-CORE PROCESSOR SYSTEM

BACKGROUND

The present invention relates to the field of digital computer systems, and more specifically, to a method for a computer system comprising a plurality of processor cores.

In concurrent programming, concurrent accesses to shared resources can lead to unexpected or erroneous behavior, so parts of a program where the shared resource is accessed may be protected. This protected section may be referred to as an atomic primitive, critical section, or critical region. The atomic primitive may access a shared resource, such as a data structure that would not operate correctly in the context of multiple concurrent accesses. However, there is a need to better control the usage of an atomic primitive in a multi-core processor.

SUMMARY

Various embodiments of the present disclosure provide a method for a computer system, comprising a plurality of processor cores, computer program product, and processor system as described by the subject matter of the independent claims. Advantageous embodiments are described in the dependent claims. Embodiments of the present disclosure can be freely combined with each other, if they are not mutually exclusive.

In one aspect, the present disclosure relates to a method for a computer system comprising a plurality of processor cores, wherein a data item is assigned exclusively to a first processor core, of the plurality of processor cores, for executing an atomic primitive. The method includes receiving, from a second processor core at a cache controller, a request for accessing the data item, and in response to determining that execution of the atomic primitive is not completed by the first processor core, returning a rejection message to the second processor core.

In exemplary embodiments, the method further includes providing a cache protocol indicative of multiple data states of the cache controller, wherein each state of the multiple data states is associated with respective actions to be performed by the cache controller. The method includes receiving the request when the cache controller is in a first state of the multiple data states, switching, by the cache controller, from the first state to a second state wherein the determining is performed in the second state of the cache controller, in accordance with actions of the second state, and switching from the second state to a third state, of the multiple data states, wherein the returning is performed in the third state in accordance with actions associated with the third state.

In exemplary embodiments, the method further includes assigning a given data state, of the multiple data states, to the data item, wherein the determining that the execution of the atomic primitive is not completed comprises determining by the cache controller that the requested data item is in the given data state In exemplary embodiments, wherein the receiving of the request comprises monitoring a bus system connecting the cache controller and the processor cores, and wherein the returning of the rejection message comprises generating a system-bus transaction indicative of the rejection message.

In exemplary embodiments, the method further includes returning the data item, in response to determining that the atomic primitive is completed.

In exemplary embodiments, the method further includes causing the second processor core to resubmit the request for accessing the data item after a predefined maximum execution time of the atomic primitive.

In exemplary embodiments, wherein returning the rejection message to the second processor core further includes causing the second processor core to execute one or more further instructions while the atomic primitive is being executed, wherein the further instructions are different from an instruction for requesting the data item.

In exemplary embodiments, wherein the execution of the atomic primitive includes accessing data shared between the first processor core and the second processor core, and wherein the received request is a request for enabling access to the shared data by the second processor core.

In exemplary embodiments, wherein the data item is a lock acquired by the first processor core to execute the atomic primitive, and wherein determining that the execution of the atomic primitive is not completed comprises determining that the lock is not available.

In exemplary embodiments, wherein the cache line is released after the execution of the atomic primitive is completed.

In exemplary embodiments, wherein the data item is cached in a cache of the first processor core.

In exemplary embodiments, wherein the data item is cached in a cache shared between the first processor core and the second processor core.

In exemplary embodiments, the method further includes providing a processor instruction, wherein the receiving of the request is the result of executing the processor instruction by the second processor core, and wherein the determining and returning steps are performed in response to determining that the received request is triggered by the processor instruction.

In another aspect, the present disclosure relates to a processor system with coherency maintained by a cache controller of the processor system, wherein the processor system comprises a plurality of processor cores. The cache controller is configured for receiving from a second processor core, of the plurality of processor cores, a request for accessing a data item, and in response to determining that execution of an atomic primitive is not completed by a first processor core, of the plurality of processor cores, returning a rejection message to the second processor core.

In another aspect, the present disclosure relates to a computer program product comprising one or more computer readable storage mediums collectively storing program instructions that are executable by a processor or programmable circuitry to cause the processor or the programmable circuitry to perform a method for a computer system comprising a plurality of processor cores, wherein a data item is assigned exclusively to a first processor core, of the plurality of processor cores, for executing an atomic primitive by the first processor core; the method including a request for accessing a data item, and in response to determining that execution of an atomic primitive is not completed by a first processor core, of the plurality of processor cores, returning a rejection message to the second processor core.

BRIEF DESCRIPTION OF THE SEVERAL VIEWS OF THE DRAWINGS

In the following embodiments the present disclosure is explained in greater detail, by way of example only, referring to the drawings in which.

DETAILED DESCRIPTION

Figure 1:
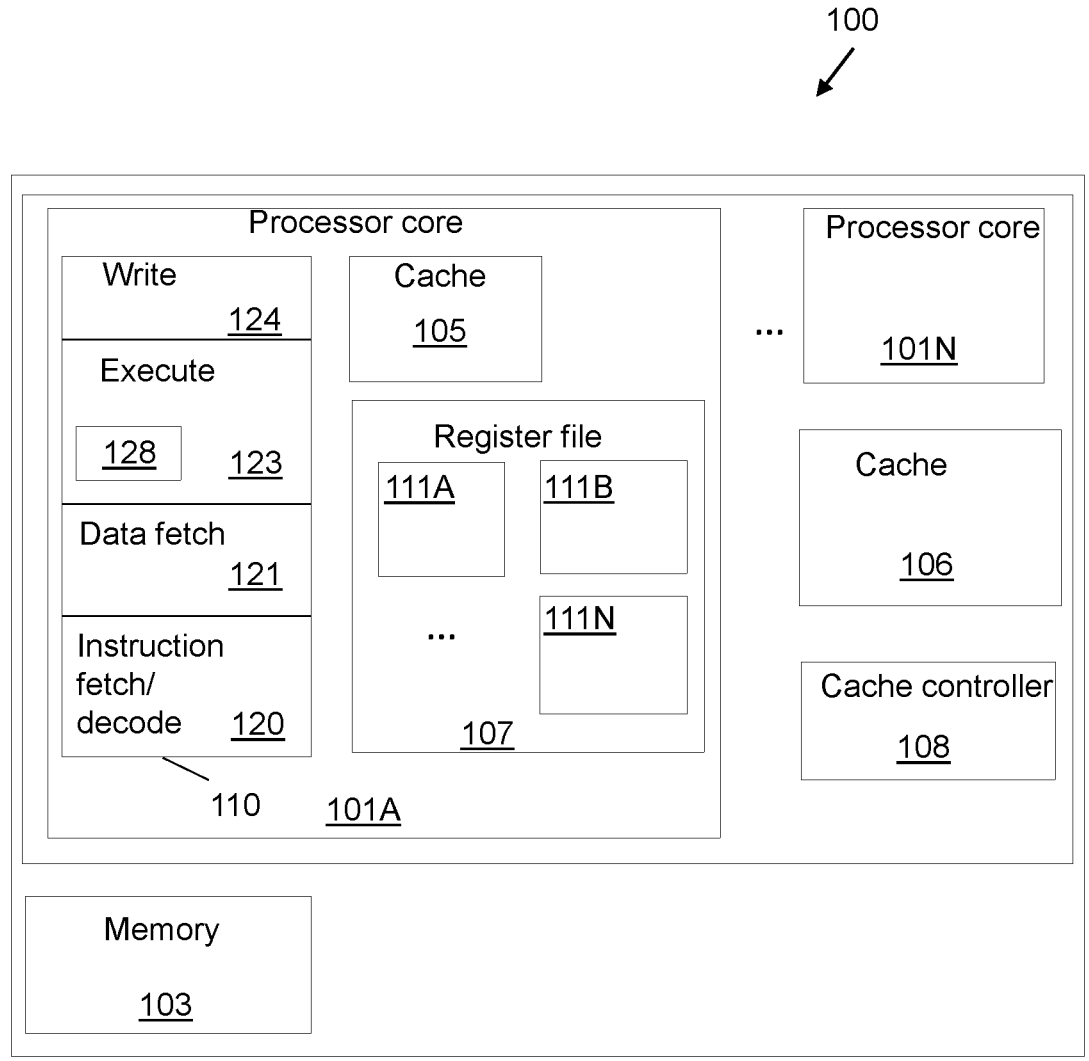
FIG. 1 depicts an example multiprocessor system, in accordance with embodiments of the present disclosure.

The descriptions of the various embodiments of the present disclosure will be presented for purposes of illustration, and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand.

The present disclosure may prevent that, when a given processor core enters an atomic primitive, other processor cores do not have to wait (e.g., by continuously requesting for a lock) for the given processor core until it completes the atomic primitive. The other processor cores may perform other tasks while the atomic primitive is being executed. This may enable an efficient use of the processor resources. The terms "core" and "processor core" are used interchangeably herein.

The atomic primitive may be defined by a storage location and a set of one or more instructions. The set of one or more instructions may have access to the storage location. The storage location may be associated with a lock that limits access to that location. To enter the atomic primitive the lock must be acquired. Once acquired, the atomic primitive is executed (i.e., the set of instructions are executed) exclusively by a core that acquired the lock. Once the lock is released this indicates that the core has left the atomic primitive.

According to one embodiment, the method further comprises: providing a cache protocol indicative of multiple possible states of the cache controller, wherein each state of the multiple states is associated with respective actions to be performed by the cache controller, receiving the request when the cache controller is in a first state of the multiple states, switching by the cache controller from the first state to a second state such that the determining is performed in the second state of the cache controller, in accordance with actions of the second state, and switching from the second state to a third state, of the multiple states, such that the returning is performed in the third state, in accordance with actions associated with the third state. The cache protocol may, for example, be a snoop broadcast-based protocol. This may enable a seamless integration of the present method within existing systems.

According to one embodiment, the cache protocol further indicates multiple data states. The data state of a data item indicates ownership state or coherency state of the data item. The data state of the data item enables a coherent access to the data item by the multiple processor cores. The method further comprises: assigning a given data state of the multiple data states to the data item, wherein the determining that the execution of the atomic primitive is not completed comprises determining by the cache controller that the requested data item is in the given data state. For example, cache-line metadata may be used to indicate the coherency state of the data items used in the atomic primitive.

According to one embodiment, the receiving of the request comprises monitoring a bus system connecting the cache controller and the processor cores, wherein the returning of the rejection message comprises generating a system bus transaction indicative of the rejection message.

According to one embodiment, the method further comprises in response to determining that the atomic primitive is completed, returning the data item. This may enable the second processor core to receive the requested data item without having to perform repeated requests. The second processor core may perform other tasks. This may increase the performance of the computer system.

According to one embodiment, the method further comprises causing the second processor core to resubmit the request for accessing the data item after a predefined maximum execution time of the atomic primitive. This may prevent the second processor core from entering a loop of repeated requests without doing any additional task.

According to one embodiment, returning the rejection message to the second processor core further includes causing the second processor core to execute one or more further instructions while the atomic primitive is being executed, wherein the further instructions are different from an instruction for requesting the data item. This may enable an efficient use of the processor resources compared to the case where the second processor core has to wait for the first processor core is finished executing the atomic primitive.

According to one embodiment, the execution of the atomic primitive comprises accessing data shared between the first processor core and the second processor core, wherein the received request is a request for enabling access to the shared data by the second processor core.

According to one embodiment, the data item is a lock acquired by the first processor core to execute the atomic primitive, wherein determining that the execution of the atomic primitive is not completed comprises determining that the lock is not available. This embodiment may seamlessly be integrated in exciting systems. The lock may for example be released by use of a regular store instruction.

According to one embodiment, the cache line associated with the data item is released after the execution of the atomic primitive is completed.

According to one embodiment, the data item is cached in a cache of the first processor core. The cache of the first processor core may be a data cache or instruction cache.

According to one embodiment, the data item is cached in a cache shared between the first processor core and the second processor core. The cache may be a data cache or instruction cache.

According to one embodiment, the method further comprises providing a processor instruction, wherein the receiving of the request is the result of executing the processor instruction by the second processor core, and wherein the determining and returning steps are performed in response to determining that the received request is triggered by the processor instruction.

The processor instruction may be named Tentative Exclusive Load & Test (TELT). The TELT instruction may be issued by the core in the same way as a Load & Test instruction. The TELT instruction can either return the cache line and do a test or can get a reject response. The reject response does not return the cache line data and therefore does not install it in the cache. Instead, the reject response is treated in the same way as if the Load & Test instruction failed. The TELT instruction may be beneficial as it may work with stiff-arming, because it is non-blocking (i.e., providing a reject response without changing a cache line state). Another advantage may be that it may provide a faster response to the requesting core such that it enables other cores to work on other tasks. Another advantage is that the TELT instruction does not steal the cache line from the lock owner (e.g., no exclusive fetch prior to unlock is needed).

The TELT instruction may have an RX or RXE format such as the LOAD Instruction. In case the data specified by the second operand of the TELT instruction is available, the data is placed at the first operand of the TELT instruction. The contents of the first operand are unspecified in case the data is not available. The resulting condition codes of the TELT instruction may be as follows: "0" indicates that the result is zero, "1" indicates that the result is less than zero, "2" indicates that the result is greater than zero and "3" indicates that the data is not available. In a typical programming sequence, depending on the condition code, the result will be processed later.

The TELT instruction may be provided as part of the instruction set architecture (ISA) associated with the processor system.

FIG. 1 depicts an example multiprocessor system 100, in accordance with embodiments of the present disclosure. The multiprocessor system 100 comprises multiple processor cores 101A-N. The multiple processor cores 101A-N may, for example, reside on a same processor chip such as an International Business Machines (IBM) central processor (CP) chip. The multiple processor cores 101A-N may, for example, share a cache 106 that resides on the same chip. The multiprocessor system 100 further comprises a main memory 103. For simplification of the description, only components of the processor core 101A are described herein; the other processor cores 101B-N may have a similar structure.

The processor core 101A may comprise a cache 105 associated with the processor core 101. The cache 105 is employed to buffer memory data to improve processor performance. The cache 105 is a high-speed buffer holding cache lines of memory data that are likely to be used (e.g., cache 105 is configured to cache data of the main memory 103). Typical cache lines are 64, 128, or 256 bytes of memory data. The processor core cache maintains metadata for each line it contains identifying the address and ownership state.

The processor core 101A may comprise an instruction execution pipeline 110. The execution pipeline 110 may include multiple pipeline stages, where each stage includes a logic circuitry fabricated to perform operations of a specific stage in a multi-stage process needed to fully execute an instruction. Execution pipeline 110 may include an instruction fetch and decode unit 120, a data fetch unit 121, an execution unit 123, and a write back unit 124.

The instruction fetch and decode unit 120 is configured to fetch an instruction of the pipeline 110 and to decode the fetched instruction. Data fetch unit 121 may retrieve data items to be processed from registers 111A-N. The execution unit 123 may typically receive information about a decoded instruction (e.g., from the fetch and decode unit 120) and may perform operations on operands according to the opcode of the instruction. The execution unit 123 may include a logic circuitry to execute instructions specified in the ISA of the processor core 101A. Results of the execution may be stored either in memory 103, registers 111A-N, or in other machine hardware (such as control registers) by the write unit 124.

The processor core 101A may further comprise a register file 107 comprising the registers 111A-111N associated with the processor core 101. The registers 111A-N may for example be general purpose registers that each may include a certain number of bits to store data items processed by instructions executed in pipeline 110.

The source code of a program may be compiled into a series of machine-executable instructions defined in an ISA associated with processor core 101A. When processor core 101A starts to execute the executable instructions, these machine-executable instructions may be placed on pipeline 110 to be executed sequentially. Instruction fetch and decode unit 120 may retrieve an instruction placed on pipeline 110 and identify an identifier associated with the instruction. The instruction identifier may associate the received instruction with a circuit implementation of the instruction specified in the ISA of processor core 101A.

The instructions of the ISA may be provided to process data items stored in memory 103 and/or in registers 111A-N. For example, an instruction may retrieve a data item from the memory 103 to a register 111A-N. Data fetch unit 121 may retrieve data items to be processed from registers 111A-N. Execution unit 123 may include logic circuitry to execute instructions specified in the ISA of processor core 101A. After execution of an instruction to process data items retrieved by data fetch unit 121, write unit 124 may output and store the results in registers 111A-N.

An atomic primitive 128 can be constructed from one or more instructions defined in the ISA of processor core 101A. The primitive 128 may, for example, include a read instruction executed by the processor core, and it is guaranteed that no other processor core 101B-N can access and/or modify the data item stored at the memory location read by the read instruction until the processor core 101A has completed the execution of the primitive.

The processor cores 101A-N share processor cache 106 for main memory 103. The processor cache 106 may be managed by a cache controller 108.

Figure 2A:
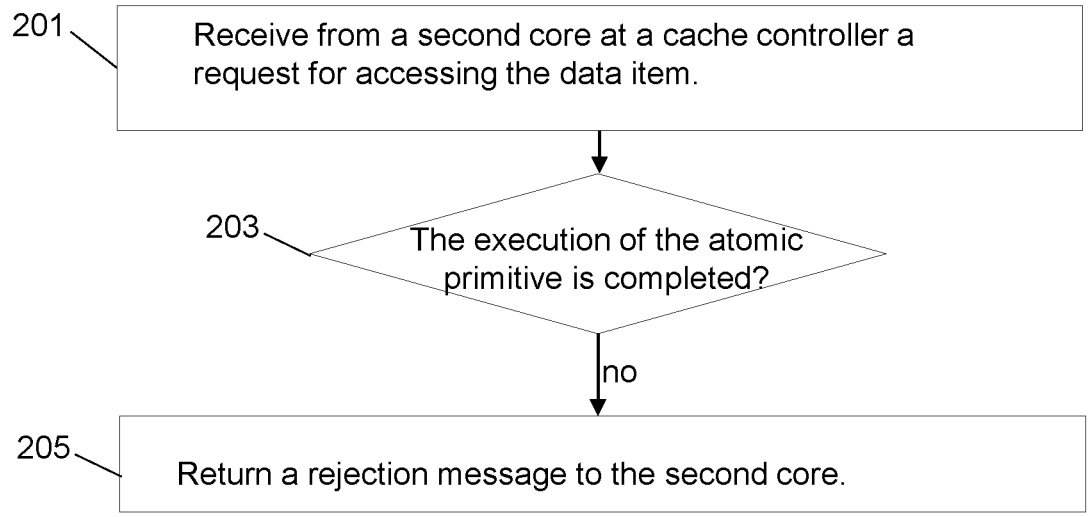
FIG. 2A depicts a flowchart of a method for processing data requests of multiple processor cores, in accordance with embodiments of the present disclosure.

FIG. 2A depicts a flowchart of a method for processing data requests of multiple processor cores (e.g., 101A-N), in accordance with embodiments of the present disclosure. For example, one first processor core (e.g., 101A) is assigned exclusively a data item for executing an atomic primitive (e.g., 128). For example, the data item may be protected by the atomic primitive to prevent two processes from changing the content of the data item concurrently. Once entering the atomic primitive, other cores are prevented from accessing data protected by the atomic primitive and a set of one or more instructions are executed (e.g., the set of instructions have access to the protected data). Once the set of instructions are finished, the atomic primitive is left. Entering an atomic primitive may be performed by acquiring a lock and leaving the atomic primitive may be performed by releasing the lock. The releasing of the lock may, for example, be triggered by a store instruction of the set of instructions. The set of instructions may be part of the atomic primitive.

In step 201, a request for accessing the data item is received at a cache controller 108 from a second processor core (e.g., one of the remaining processor cores 101B-N). The cache (e.g., 106) may, for example, comprise a cache line. The execution of the atomic primitive by the first processor core may cause a read instruction to retrieve a data block (i.e., data item) from a memory location, and to store a copy of the data block in the cache line, thereby assigning the cache line to the first processor core. The first processor core may then execute at least one instruction while the cache line is assigned to it. While executing the at least one instruction, the request of step 201 may be received. The requested data item may, for example, be data of the cache line.

For example, a user may create a program comprising instructions that can be executed by the second processor core. The program comprises the TELT instruction. The TELT instruction enables to load a cache line in case it is available. Once the TELT instruction is executed by the second processor core, the request may be issued by the second processor core. The request may, for example, be sent via a bus system connecting the processor cores and the cache controller. By monitoring the bus system, the cache controller may receive the request of the second processor core. If the requested data is available, it may be returned to the second processor core. The returning of the data to the second processor core may for example be controlled to return only specific types of data (e.g., read-only data or other types of data).

For example, the cache controller may comprise a logic circuitry that enables the cache controller to operate in accordance with a predefined cache protocol. The cache protocol may be indicative of multiple possible states of the cache controller, wherein each state of the multiple states is associated with respective actions to be performed by the cache controller. For example, when the cache controller is in a first state of the multiple states, whenever there is any request from a processor core of the processor cores to access data, the cache controller will check whether it is a request that is triggered by the TELT instruction. The cache controller may, for example, be in the first state in step 201. The cache protocol may enable the cache controller to manage coherency. For example, the cache controller may manage the cache data and its coherency using metadata. For example, at any level of the cache hierarchy, the data backing (no cache) may be dispensed by keeping a directory of cache lines held by lower level caches.

For example, the request for accessing the data item may be a tagged request (e.g., triggered by the TELT instruction) indicating that it is a request for data being used in the atomic primitive, wherein the cache controller comprises a logic circuitry configured for recognizing the tagged request. Thus, upon receiving the request and determining that the request is triggered by the TELT instruction, the cache controller may jump to, or switch, to a second state of the multiple states in accordance with the cache protocol. For example, in the second state, the cache controller may determine (inquiry step 203) if the requested data item is in a state suitable for transfer of line ownership to the processor core requesting it or not. For example, the cache controller maintains a state for the cache lines that it holds; and can present the state of the requested data item at the time of the request. For example, the requested data item may be in a state indicating that the first processor core has the target data item exclusive, but that the execution of the atomic primitive is not complete.

In response to determining (inquiry step 203) that the execution of the atomic primitive is not completed by the first processor core 101A, a rejection message may be generated by the cache controller 108 and sent to the second core in step 205. For example, upon determining that the execution of the atomic primitive is not completed by the first processor core 101A, the cache controller may switch from the second state to a third state, in accordance with the cache protocol. In the third state, the cache controller is configured to send the rejection message. If it is determined that the execution of the atomic is completed, the data item may be returned to the second core (e.g., as described with reference to steps 311-317).

Figure 2B:
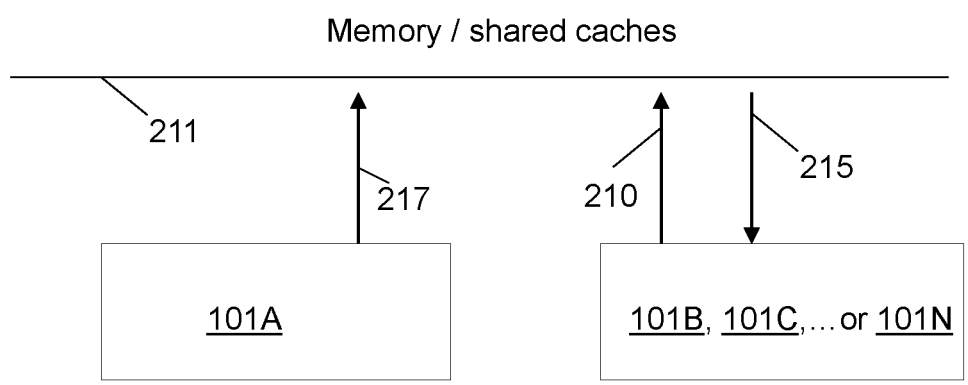
FIG. 2B is a block diagram illustrating a method for processing data requests of multiple processor cores, in accordance with embodiments of the present disclosure.

FIG. 2B is a block diagram illustrating a method for processing data requests of multiple processor cores 101A-N, in accordance with embodiments of the present disclosure. The processor core 101A may be assigned, exclusively, a data item for executing an atomic primitive. While executing the atomic primitive, another processor core 101B, 101C . . . or 101N may send (210) a fetch-request to access the cached data item. The fetch-request may, for example, be sent via a bus 211 when executing the TELT instruction by the other processor core 101B, 101C . . . or 101N. Upon receiving the submitted request, via the bus 211, the cache controller may send (215) a rejection message, via the bus 211, to the other processor core that sent the request. For example, the cache controller may be configured to perform predefined actions depending on the received requests. For example, if the received request is triggered by a TELT instruction, the actions to be performed by the cache controller are to check if the execution of the atomic primitive is completed or not, and if it is not completed, the rejection message is sent by the cache controller to the requesting processor core. As illustrated in FIG. 2B, after completing the execution of the primitive 128, the processor core 101A may release (217) the data item that is assigned to it. This may, for example, be performed by the processor core 101A executing a store instruction as follows "Store (unlock)".

Figure 3:
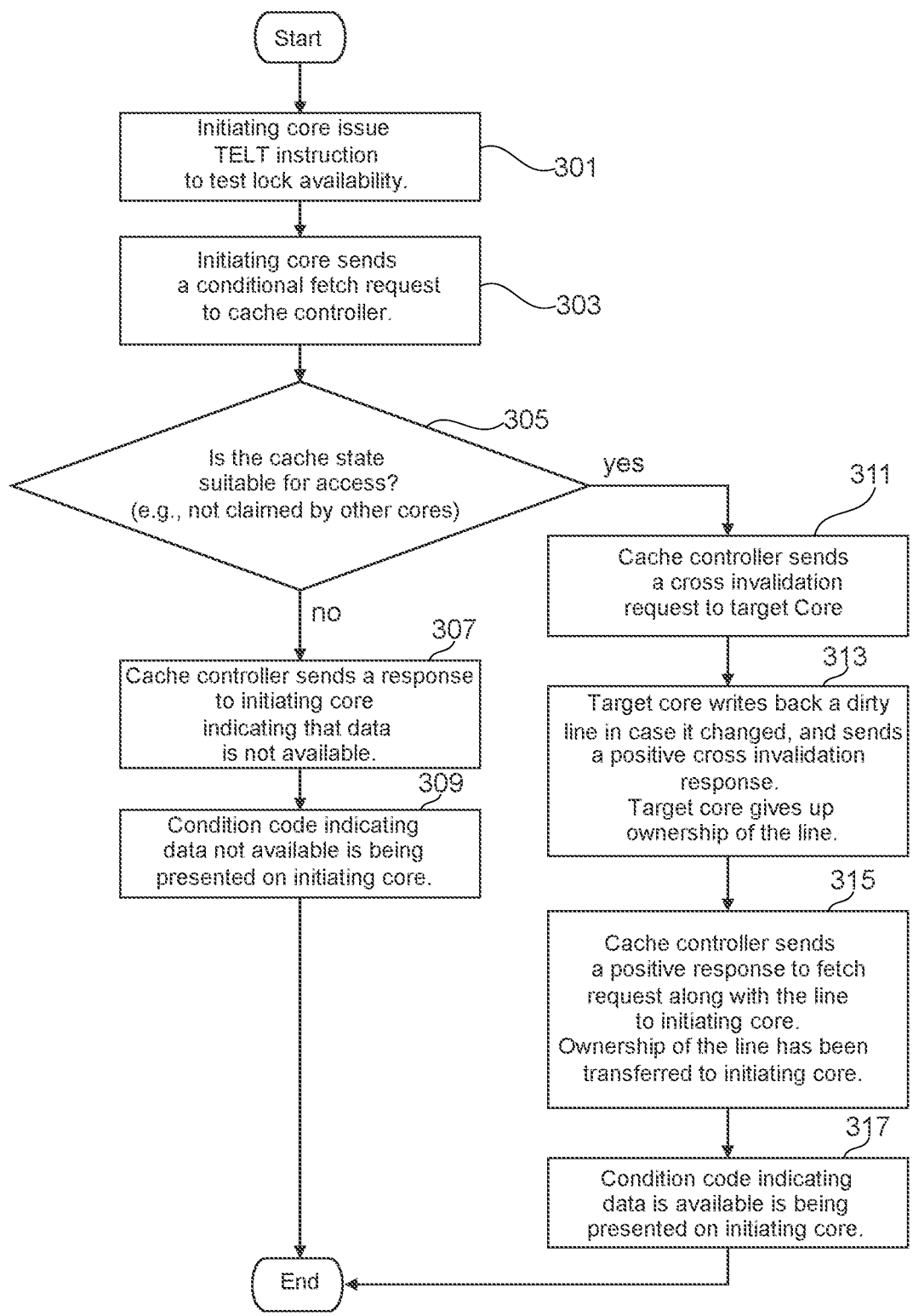
FIG. 3 depicts a flowchart of a method to implement a lock for workload distribution in a computer system comprising a plurality of processor cores, in accordance with embodiments of the present disclosure.

FIG. 3 depicts a flowchart of a method to implement a lock for workload distribution in a computer system 100 comprising a plurality of processor cores 101A-N, in accordance with embodiments of the present disclosure. The processor cores 101A-N share a processor cache 106 for a main memory 103. The processor cache is managed by a cache controller.

In step 301, an initiating processor core 101B may issue the TELT instruction to test the availability of a lock associated with an atomic primitive being executed by a target processor core 101A. This may cause the initiating processor core 101B to send, in step 303, a conditional fetch request for the cache line to the cache controller 108.

If it is determined by the cache controller 108 (inquiry step 305) that the state of the requested cache line is not suitable for access, the cache controller 108 sends, in step 307, a response (rejection message) to the initiating processor core 101B indicating that data is not available. In step 309, a condition code indicating that the data is not available may be presented on the initiating processor core 101B.

If it is determined by the cache controller 108 (inquiry step 305) that the state of the requested cache line is suitable for access, the cache controller 108 sends, in step 311, a cross invalidation request to the target processor core 101A. In step 313, the target processor core 101A writes back a dirty line and sends a positive cross invalidation response, thereby the target core processor 101A gives up ownership of the requested cache line. In step 315, the cache controller 108 sends a positive response to the conditional fetch request to the initiating processor core 101B along with the cache line. The ownership of the cache line is transferred to the initiating processor core 101B. In step 317, a condition code indicating that the data is available may be presented on the initiating processor core 101B.

In another example, a method to implement a lock for workload distribution in a computer system, comprising a plurality of processor cores, is provided. The processor cores share a processor cache for a main memory, and the processor cache being managed by a cache controller. The method includes, in response to a tentative exclusive load and test instruction for a main memory address, a processor core sending a conditional fetch request for the main memory address to the cache controller. The method further includes, in response to a conditional fetch request for a main memory address from an initiating processor core, the cache controller sending a conditional cross invalidation request for the main memory address to the target processor core currently in possession of the cache line of the main memory address. The method further includes, in response to a conditional cross invalidation request from the cache controller, the target processor currently in possession of the cache line for a main memory address determining if it can transfer the ownership of the cache line, and if not, responding to the cache controller that the data is not available, otherwise writing back the cache line in case it was changed, releasing ownership of the cache line, and responding to the cache controller with a positive cross invalidation request and the cache line. The method further includes, in response to a positive cross invalidation request with a released cache line from the target processor core, the cache controller responding to the initiating processor core with the released cache line, otherwise responding to the initiating processor that the data is not available.

Various embodiments are specified in the following numbered clauses.

1. A method for a computer system comprising a plurality of processor cores, wherein a data item is assigned exclusively to a first processor core, of the plurality of processor cores, for executing an atomic primitive; the method includes receiving from a second processor core at a cache controller a request for accessing the data item, and in response to determining that execution of the atomic primitive is not completed by the first processor core, returning a rejection message to the second processor core.

2. The method of clause 1, further includes providing a cache protocol indicative of multiple possible states of the cache controller, wherein each state of the multiple states is associated with respective actions to be performed by the cache controller, the method includes receiving the request when the cache controller is in a first state of the multiple states, switching by the cache controller from the first state to a second state such that the determining is performed in the second state of the cache controller, in accordance with actions of the second state, and switching from the second state to a third state of the multiple states such that the returning is performed in the third state in accordance with actions associated with the third state.

3. The method of clause 2, the cache protocol further indicating multiple data states, the method includes assigning a given data state, of the multiple data states, to the data item, wherein the determining that the execution of the atomic primitive is not completed comprises determining by the cache controller that the requested data item is in the given data state.

4. The method of any of the preceding clauses, the receiving of the request comprises monitoring a bus system connecting the cache controller and the processor cores, wherein the returning of the rejection message comprises generating a system bus transaction indicative of the rejection message.

5. The method of any of the preceding clauses, further comprising in response to determining that the atomic primitive is completed, returning the data item.

6. The method of any of the preceding clauses, further comprising causing the second core to resubmit the request for accessing the data item after a predefined maximum execution time of the atomic primitive.

7. The method of any of the preceding clauses, wherein returning the rejection message to the second core further comprises: causing the second core to execute one or more further instructions while the atomic primitive is being executed, the further instructions being different from an instruction for requesting the data item.

8. The method of any of the preceding clauses, wherein the execution of the atomic primitive comprises accessing data shared between the first and second cores, wherein the received request is a request for enabling access to the shared data by the second core.

9. The method of any of the preceding clauses, wherein the data item is a lock acquired by the first core to execute the atomic primitive, wherein determining that the execution of the atomic primitive is not completed comprises determining that the lock is not available.

10. The method of any of the preceding clauses, wherein the cache line is released after the execution of the atomic primitive is competed.

11. The method of any of the preceding clauses, wherein the data item is cached in a cache of the first core.

12. The method of any of the preceding clauses 1-11, wherein the data item is cached in a cache shared between the first and second cores.

13. The method of any of the preceding clauses, further comprising providing a processor instruction, wherein the receiving of the request is the result of executing the processor instruction by the second core, wherein the determining and returning steps are performed in response to determining that the received request is triggered by the processor instruction.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a computer system comprising a plurality of processor cores, wherein a data item is assigned exclusively to a first processor core of the plurality of processor cores for executing an atomic primitive, the method comprising:

receiving, from a second processor core at a cache controller in a first state of a plurality of states, a request for accessing the data item, wherein the receiving of the request from the second processor core is a result of executing a tentative exclusive load and test (TELT) instruction by the second processor core, wherein the request for accessing the data item is a tagged request indicating the request for accessing the data item is triggered by the execution of the TELT instruction, the cache controller including a logic circuitry to recognize the tagged request; and in response to determining, by the cache controller in a second state of the plurality of states, that execution of the atomic primitive is not completed by the first processor core, returning, by the cache controller in a third state of the plurality of states, a rejection message to the second processor core, wherein the determining and the returning are performed in response to determining that the request for accessing the data item from the second processor core is triggered by the execution of the TELT instruction.

2. The method of claim 1, wherein a cache protocol further indicating multiple data states is provided, the method comprising:

assigning a given data state of the multiple data states to the data item, wherein the determining that the execution of the atomic primitive is not completed comprises determining by the cache controller that the requested data item is in the given data state.

3. The method of claim 1, wherein the receiving of the request comprises monitoring a bus system connecting the cache controller and the processor cores, and wherein the returning of the rejection message comprises generating a system-bus transaction indicative of the rejection message.

4. The method of claim 1, further comprising:
in response to determining that the atomic primitive is completed, returning the data item.

5. The method of claim 1, further comprising:
causing the second processor core to resubmit the request for accessing the data item after a predefined maximum execution time of the atomic primitive.

6. The method of claim 1, wherein returning the rejection message to the second processor core further comprises:
causing the second processor core to execute one or more further instructions while the atomic primitive is being executed, wherein the further instructions are different from an instruction for requesting the data item.

7. The method of claim 1, wherein the execution of the atomic primitive comprises accessing data shared between the first processor core and the second processor core, and wherein the received request is a request for enabling access to the shared data by the second processor core.

8. The method of claim 1, wherein the data item is a lock acquired by the first processor core to execute the atomic primitive, and wherein determining that the execution of the atomic primitive is not completed comprises determining that the lock is not available.

9. The method of claim 1, wherein the cache line is released after the execution of the atomic primitive is completed.

10. The method of claim 1, wherein the data item is cached in a cache of the first processor core.

11. The method of claim 1, wherein the data item is cached in a cache shared between the first processor core and the second processor core.

12. A processor system comprising a cache controller and a plurality of processor cores, wherein coherency is maintained by the cache controller of the processor system, the cache controller being configured for:
receiving, from a second processor core at a cache controller in a first state of a plurality of states, a request for accessing the data item, wherein the receiving of the request from the second processor core is a result of executing a tentative exclusive load and test (TELT) instruction by the second processor core, wherein the request for accessing the data item is a tagged request indicating the request for accessing the data item is triggered by the execution of the TELT instruction, the cache controller including a logic circuitry to recognize the tagged request; and
in response to determining, by the cache controller in a second state of the plurality of states, that execution of the atomic primitive is not completed by the first processor core, returning, by the cache controller in a third state of the plurality of states, a rejection message to the second processor core, wherein the determining and the returning are performed in response to determining that the request for accessing the data item from the second processor core is triggered by the execution of the TELT instruction.

13. The processor system of claim 12, wherein a cache protocol further indicating multiple data states is provided, the method comprising:
assigning a given data state of the multiple data states to the data item, wherein the
determining that the execution of the atomic primitive is not completed comprises
determining by the cache controller that the requested data item is in the given data state.

14. The processor system of claim 12, wherein the receiving of the request comprises monitoring a bus system connecting the cache controller and the processor cores, and wherein the returning of the rejection message comprises generating a system-bus transaction indicative of the rejection message.

15. The processor system of claim 12, further comprising:
in response to determining that the atomic primitive is completed, returning the data item.

16. A computer program product comprising one or more computer readable storage mediums collectively storing program instructions that are executable by a processor or programmable circuitry to cause the processor or the programmable circuitry to perform a method for a computer system comprising a plurality of processor cores, wherein a data item is assigned exclusively to a first processor core, of the plurality of processor cores, for executing an atomic primitive by the first processor core, the method comprising:
receiving, from a second processor core at a cache controller in a first state of a plurality of states, a request for accessing the data item, wherein the receiving of the request from the second processor core is a result of executing a tentative exclusive load and test (TELT) instruction by the second processor core, wherein the request for accessing the data item is a tagged request indicating the request for accessing the data item is triggered by the execution of the TELT instruction, the cache controller including a logic circuitry to recognize the tagged request; and
in response to determining, by the cache controller in a second state of the plurality of states, that execution of the atomic primitive is not completed by the first processor core, returning, by the cache controller in a third state of the plurality of states, a rejection message to the second processor core, wherein the determining and the returning are performed in response to determining that the request for accessing the data item from the second processor core is triggered by the execution of the TELT instruction.

17. The computer program product of claim 10, wherein a cache protocol further indicating multiple data states is provided, the method comprising:
assigning a given data state of the multiple data states to the data item, wherein the determining that the execution of the atomic primitive is not completed comprises determining by the cache controller that the requested data item is in the given data state.

18. The computer program product of claim 16, wherein the receiving of the request comprises monitoring a bus system connecting the cache controller and the processor cores, and wherein the returning of the rejection message comprises generating a system-bus transaction indicative of the rejection message.

19. The computer program product of claim 16, further comprising:
in response to determining that the atomic primitive is completed, returning the data item.

20. The computer program product of claim 16, further comprising:
causing the second processor core to resubmit the request for accessing the data item after a predefined maximum execution time of the atomic primitive.

* * * * *